United States Patent [19]
Sampei et al.

[11] Patent Number: 4,941,863
[45] Date of Patent: Jul. 17, 1990

[54] STEPLESS SPEED CHANGE MECHANISM IN BELT TRANSMISSION DEVICE

[75] Inventors: Keiichi Sampei; Masami Kawasaki; Yosihito Dei; Katsumi Fukumoto; Kazuo Furukawa, all of Osaka, Japan

[73] Assignee: Kubota Ltd., Osaka, Japan

[21] Appl. No.: 329,936

[22] Filed: Mar. 28, 1989

[30] Foreign Application Priority Data

Mar. 28, 1988 [JP] Japan .................. 63-75175
Oct. 25, 1988 [JP] Japan .................. 63-270386

[51] Int. Cl.$^5$ .................................... F16H 9/16
[52] U.S. Cl. ............................ 474/33; 474/86
[58] Field of Search .................... 474/33–35, 474/69–70, 84–89

[56] References Cited

U.S. PATENT DOCUMENTS

| | | | |
|---|---|---|---|
| 2,536,483 | 1/1951 | Young | 474/86 X |
| 2,954,709 | 10/1960 | Heckel et al. | 474/86 X |
| 3,145,584 | 8/1964 | Fairbank et al. | 474/33 X |
| 3,728,905 | 4/1973 | Fell et al. | 474/87 X |
| 4,674,994 | 6/1987 | Tomiyori et al. | 474/33 X |

FOREIGN PATENT DOCUMENTS 61-199647 12/1986 Japan .

*Primary Examiner*—Thuy M. Bui

[57] ABSTRACT

A stepless speed change mechanism in a belt transmission device comprising a first belt passed through a groove in a drive pulley and a first groove in an intermediate pulley, and a second belt passed through a second groove in the intermediate pulley and a groove in a driven pulley for transmitting rotation from the drive pulley to the driven pulley via the intermediate pulley. The first groove and the second groove of the intermediate pulley have an axial width gradually decreasing radially inwardly of the pulley. A partition provided between and defining the first and second grooves of the intermediate pulley is movable axially of the pulley to thereby vary the pitch diameter of each of the first and second grooves and steplessly change the speed of rotation to be transmitted from the drive pulley to the driven pulley. The state of contact of the first belt with the first groove portion is adjusted to be different from the state of contact of the second belt with the second groove portion so that when the partition moves axially for the speed change, the axial component of the pushing force exerted on the partition by one of the first and second belts differs in magnitude from the axial component of the reaction force exerted on the partition by the other belt.

22 Claims, 12 Drawing Sheets

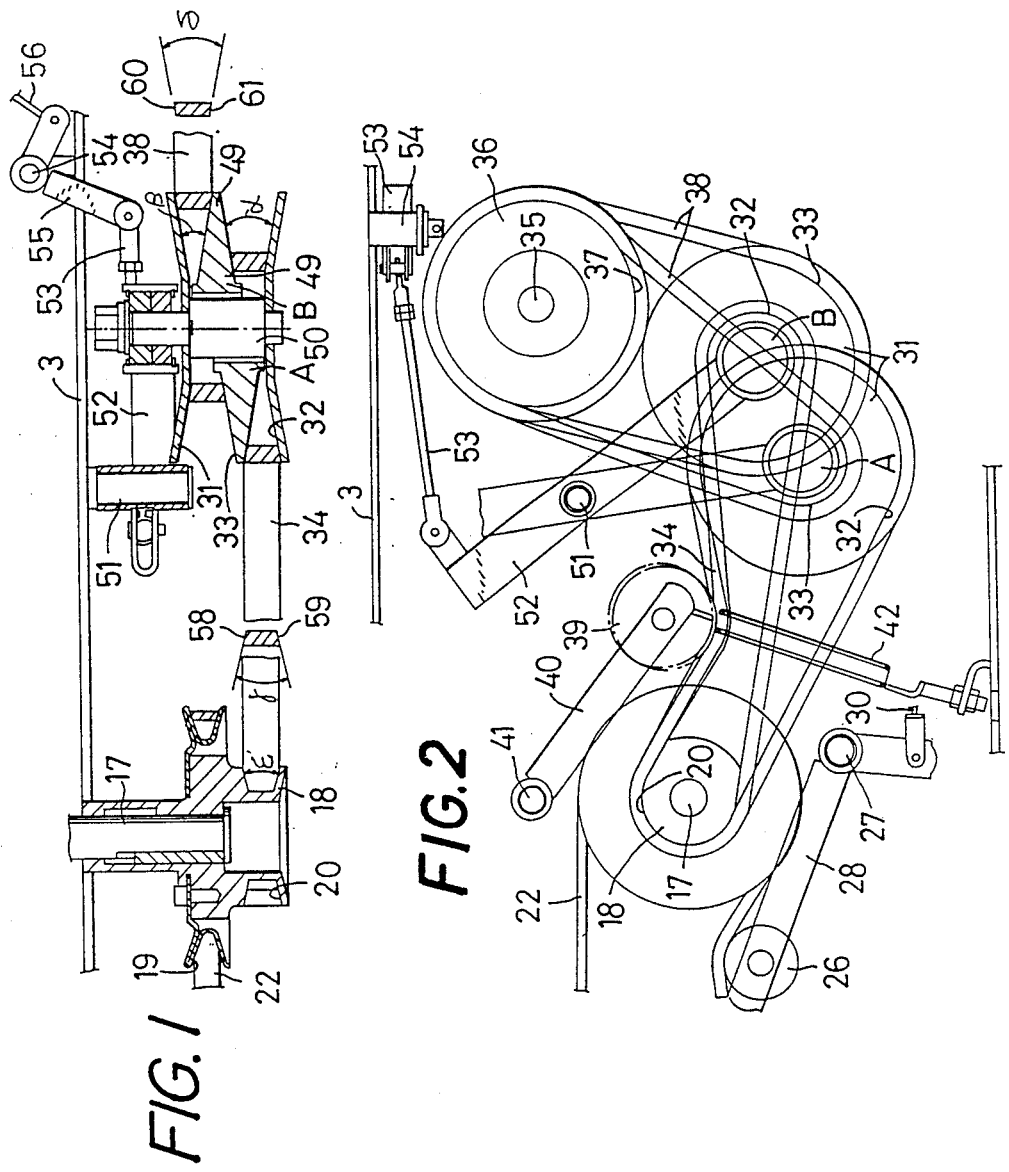

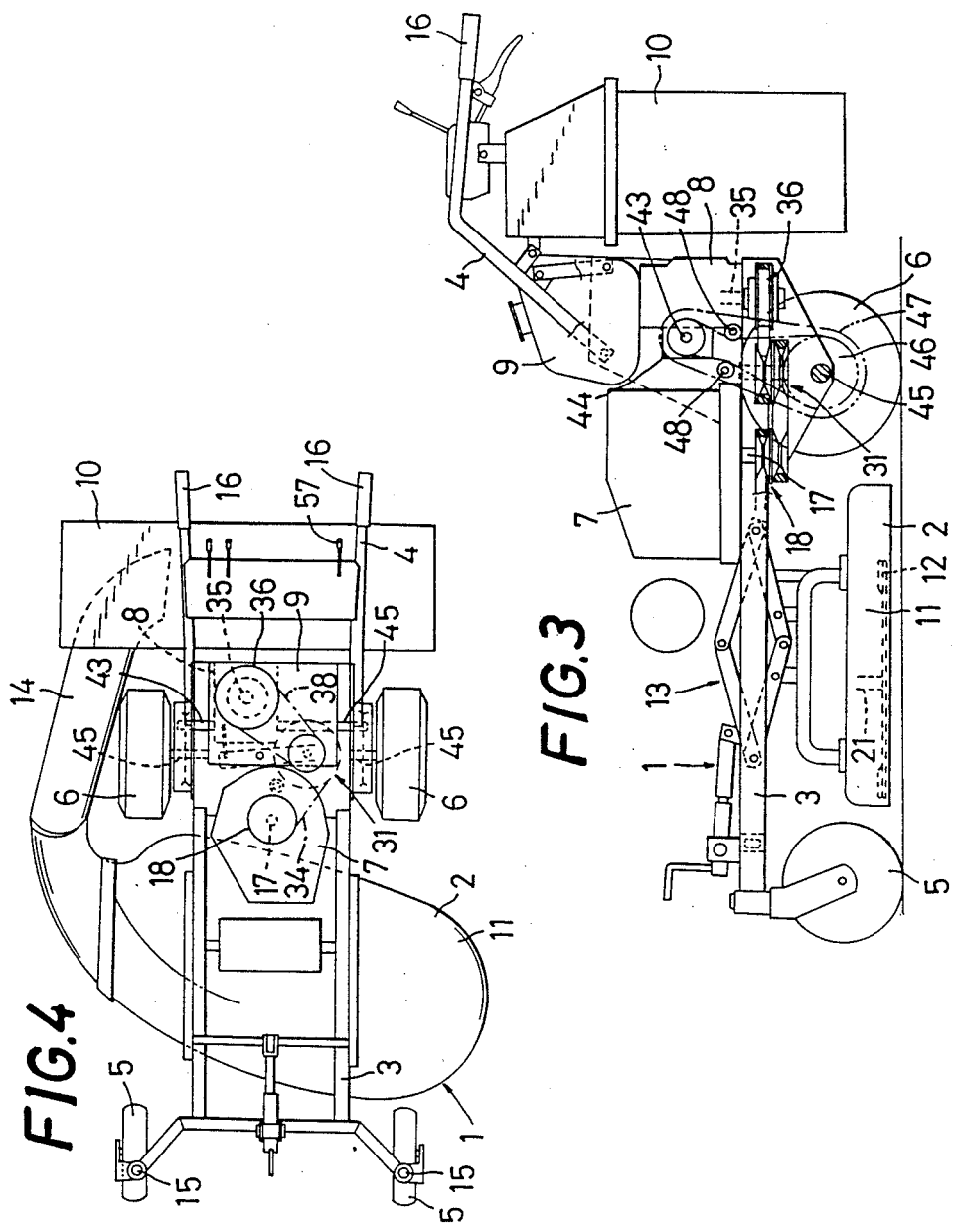

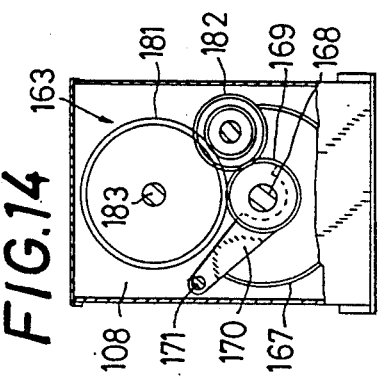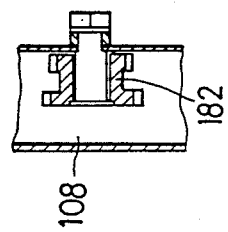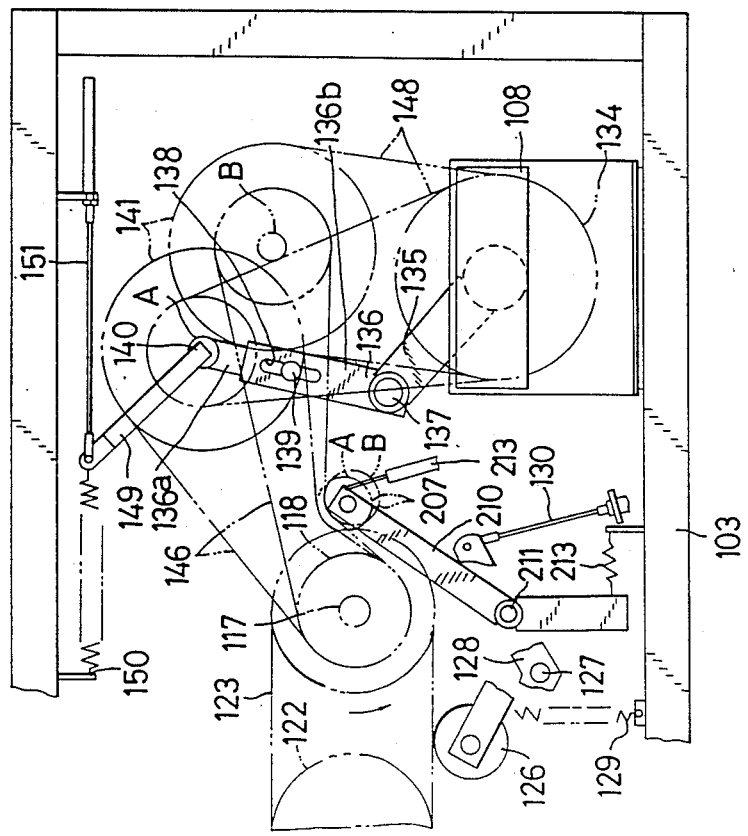

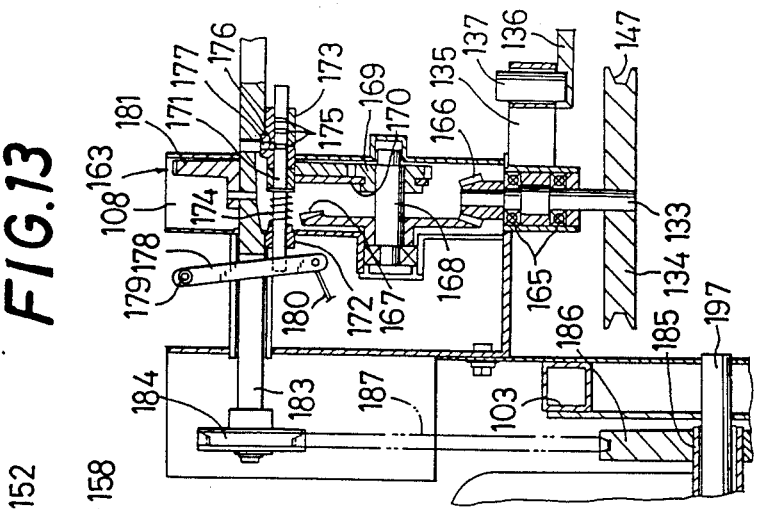
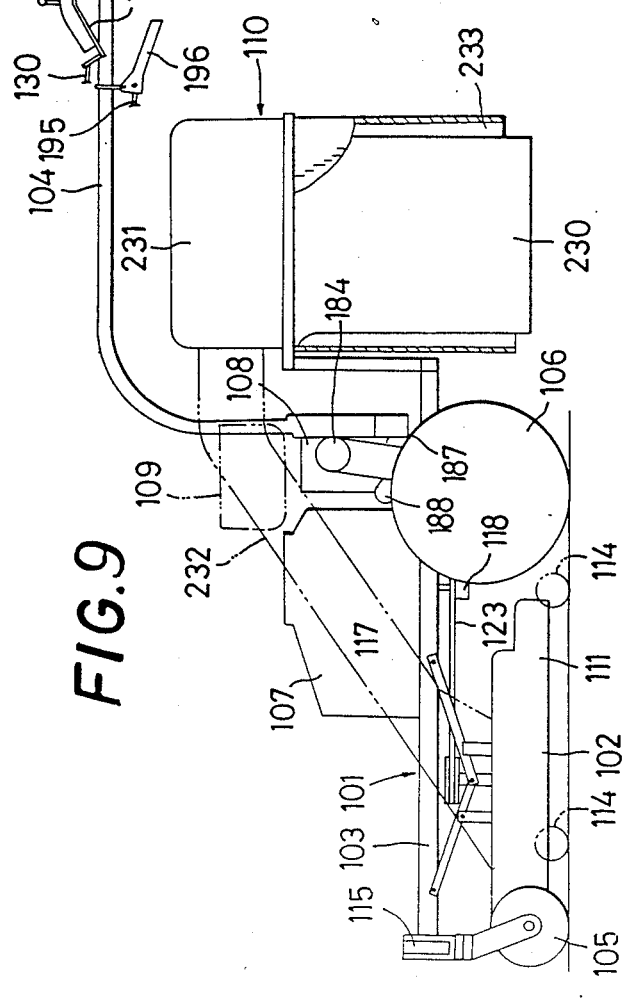

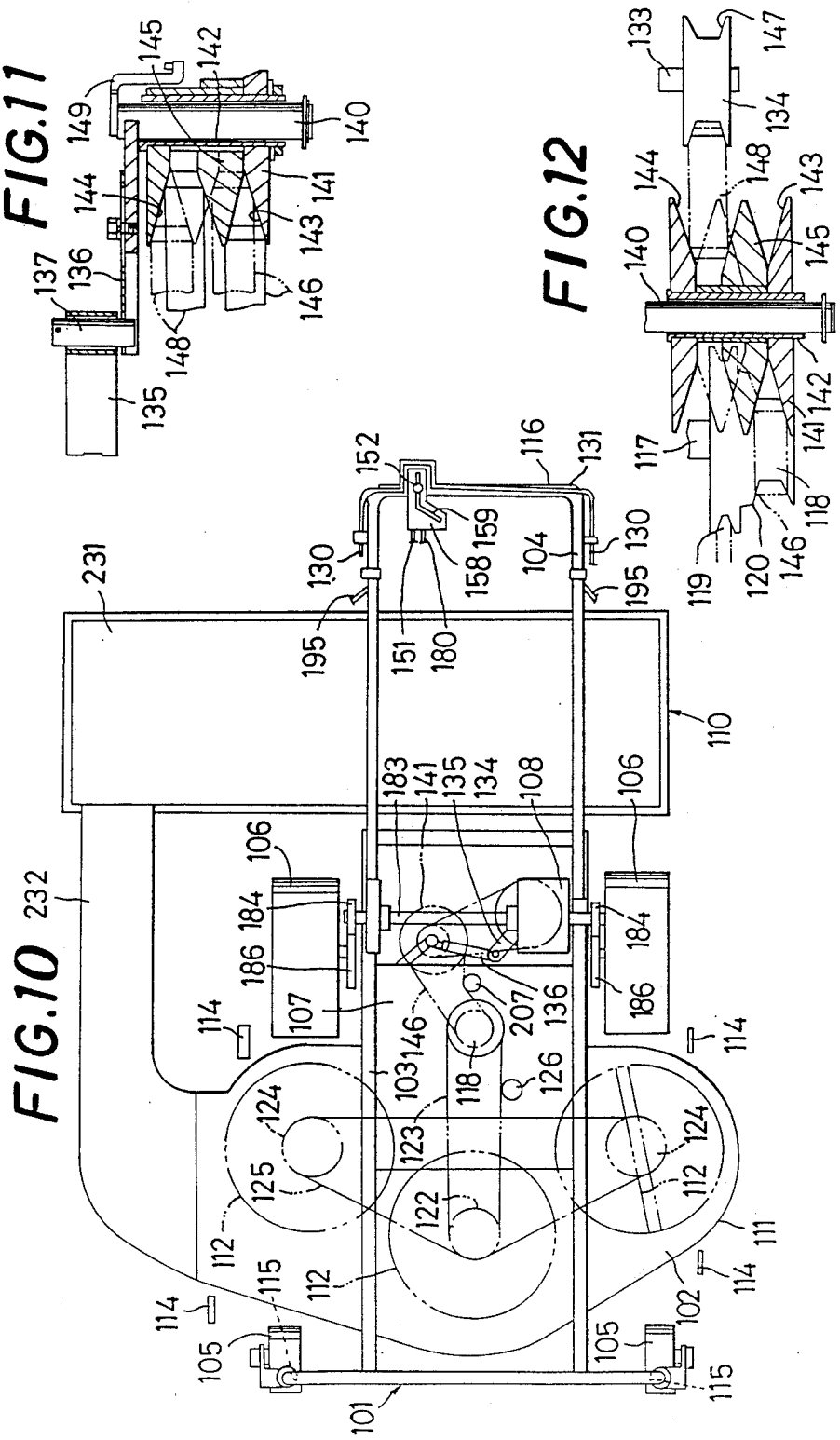

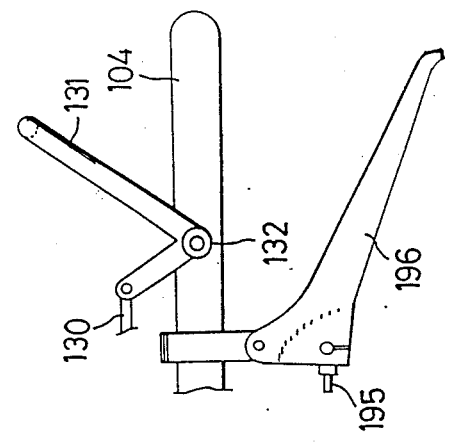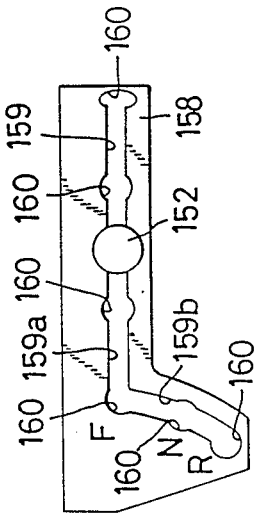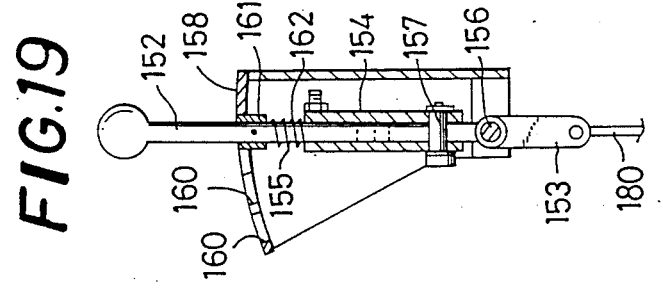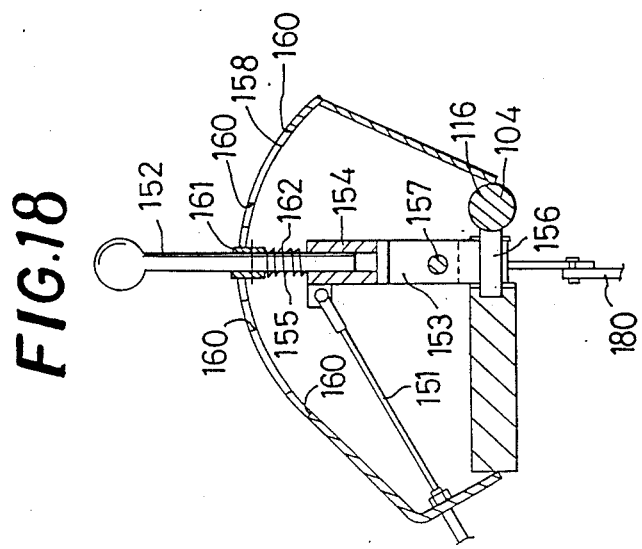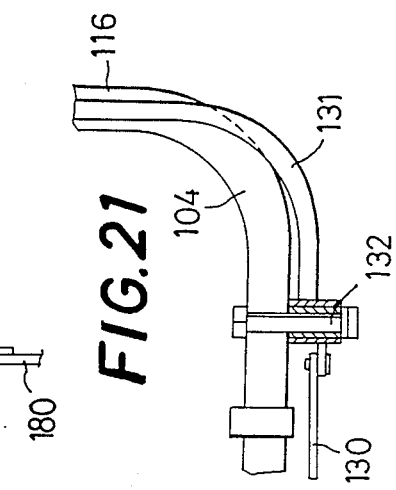

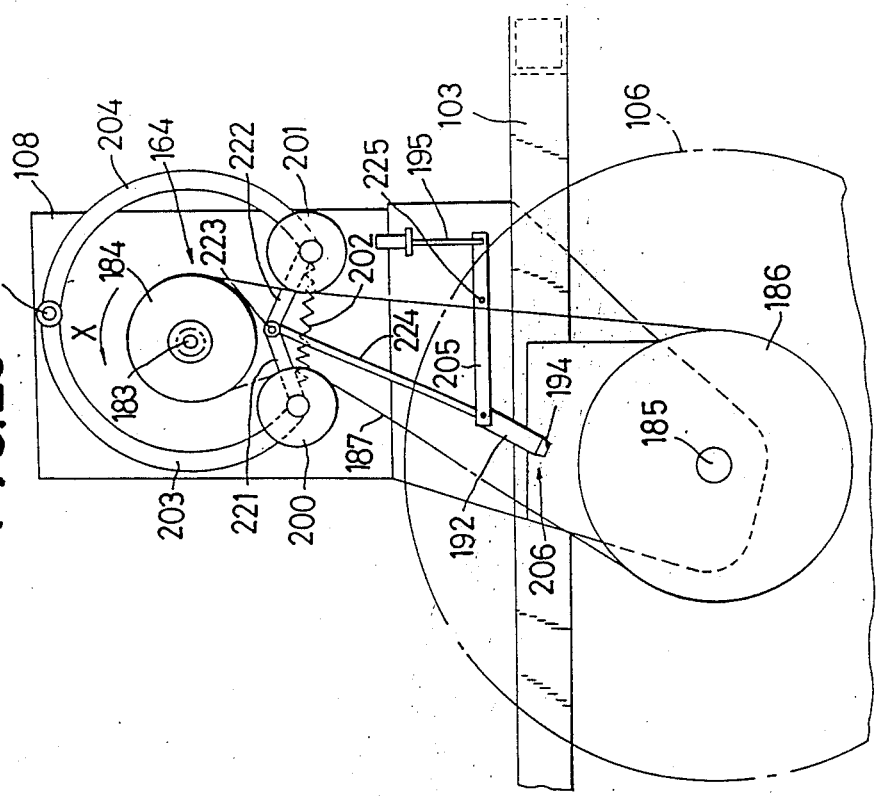
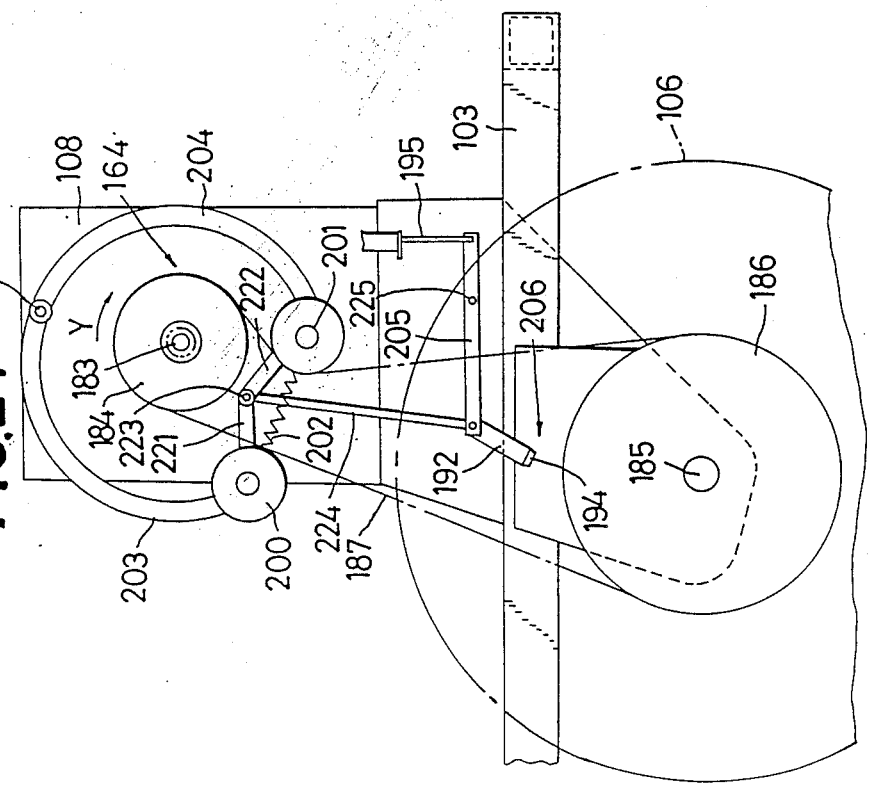

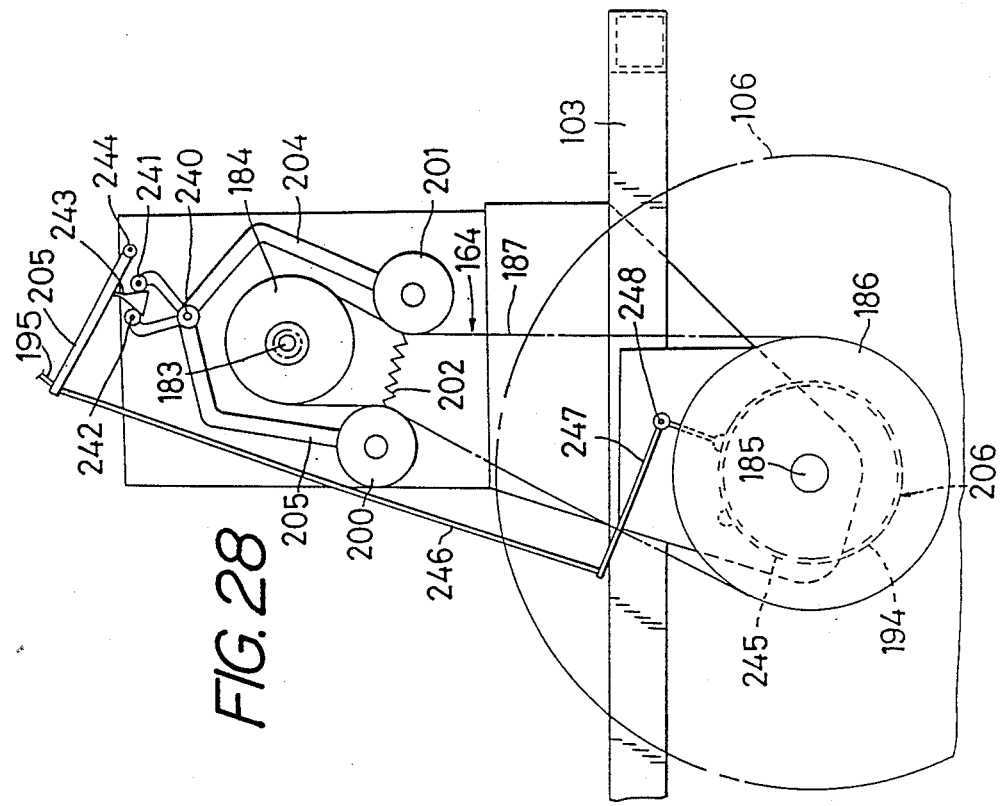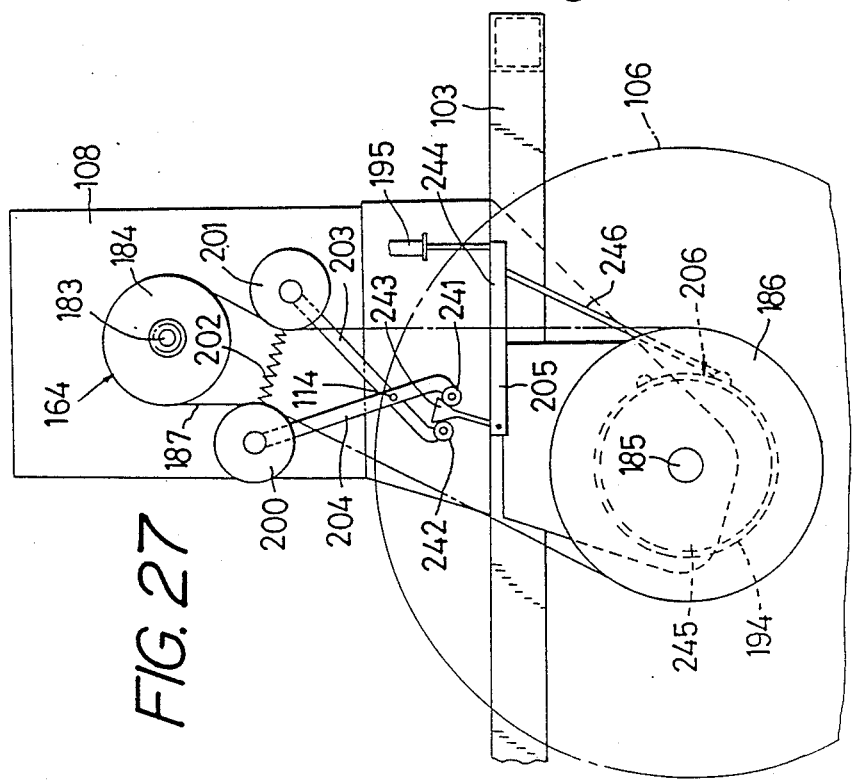

4,941,863

STEPLESS SPEED CHANGE MECHANISM IN BELT TRANSMISSION DEVICE

FIELD OF THE INVENTION AND RELATED ART STATEMENT

The present invention relates to a stepless speed change mechanism in belt transmission devices.

With conventional power transmissions wherein a belt is reeved around a drive pulley on a drive shaft and a driven pulley on a driven shaft, the speed of the drive shaft itself is altered to change the speed of the driven shaft steplessly.

When the drive shaft is driven, for example, by an internal combustion engine, the number of revolutions of the engine needs to be changed to alter the speed of the drive shaft, whereas it is not desirable to alter the speed of the drive shaft itself since the number of revolutions of the engine is correlated with the engine efficiency.

Accordingly, Japanese Utility Model Application SHO No. 61-199647 proposes as prior art a mechanism which is adapted to change the speed of the driven shaft steplessly without changing the speed of the drive shaft The proposed stepless speed change mechanism is incorporated in a belt transmission device which comprises a first belt passed through a groove in a drive pulley on a drive shaft and a first groove in an intermediate pulley on an intermediate shaft, and a second belt passed through a second groove in the intermediate pulley and a groove in a driven pulley on a driven shaft. According to the proposal, the first groove and the second groove of the intermediate pulley have an axial width gradually decreasing radially inwardly of the pulley, and a partition provided between and defining the first and second grooves is movable axially of the pulley to thereby vary the pitch diameter of each of the first and second grooves With this mechanism, the partition, when moved axially toward the second groove, decreases the pitch diameter of the first groove and increases the pitch diameter of the second groove to increase the speed of the driven shaft Conversely, the partition, when moved axially toward the first groove, decreases the speed of the driven shaft.

OBJECT AND SUMMARY OF THE INVENTION

In the case where the partition of the intermediate pulley is axially moved for a speed change, the partition must be shifted against the tension always acting on the intermediate pulley through the first and second belts. The mechanism therefore has the problem of necessitating a great force for shifting the partition.

The main object of the present invention is to overcome the above problem.

As a first feature, the present invention provides a stepless speed change mechanism in a belt transmission device comprising a first belt passed through a groove in a drive pulley on a drive shaft and a first groove in an intermediate pulley on an intermediate shaft, and a second belt passed through a second groove in the intermediate pulley and a groove in a driven pulley on a driven shaft, each of the two grooves in the intermediate pulley having an axial width gradually decreasing radially inwardly of the pulley, the first and second grooves being defined by a partition provided therebetween and movable on the intermediate shaft axially thereof, the pitch diameter of each of the two grooves in the intermediate pulley being variable by the axial movement of the partition. The state of contact of the first belt with the first groove portion is made different from the state of contact of the second belt with the second groove portion so that when the partition on the intermediate shaft is moved axially thereof, the axial component of the pushing force exerted on the partition by one of the first and second belts differs in magnitude from the axial component of the reaction force exerted on the partition by the other belt.

When a pushing force acting to axially move the partition is exerted on the second groove portion by the second belt, the first belt exerts a reaction force on the first groove portion, whereas when the pushing force is exerted on the first groove portion by the first belt, the second belt exerts a reaction force on the second groove portion. In this case, the axial component of the pushing force is different in magnitude from the axial component of the reaction force owing to the difference between the state of contact of the first belt with the first groove portion and the state of contact of the second belt with the second groove portion. Consequently, the partition of the intermediate pulley is easily movable in one axial direction in which the axial component of the pushing force is greater than the axial component of the reaction force.

Preferably, the combination of the groove angle of the first groove and the relative inclination angle between the two faces of the first belt in contact with the first groove portion is different from the combination of the groove angle of the second groove and the relative inclination angle between the two faces of the second belt in contact with the second groove portion so as to make the state of contact of the first belt with the first groove portion different from the state of contact of the second belt with the second groove portion.

Further preferably, the surface defining the first groove and in contact with the first belt is different in curvature from the surface defining the second groove and in contact with the second belt to as to make the state of contact of the first belt with the first groove portion different from the state of contact of the second belt with the second groove portion.

As a second feature, the present invention provides a stepless speed change mechanism in a belt transmission device comprising a first belt passed through a groove in a drive pulley on a drive shaft and a first groove in an intermediate pulley on an intermediate shaft, and a second belt passed through a second groove in the intermediate pulley and a groove in a driven pulley on a driven shaft, each of the two grooves in the intermediate pulley having an axial width gradually decreasing radially inwardly of the pulley, the first and second grooves being defined by a partition provided therebetween and movable on the intermediate shaft axially thereof, the pitch diameter of each of the two grooves in the intermediate pulley being variable by the axial movement of the partition. At least one of the first belt and the second belt is provided with a tension pulley movable in a direction to tension the belt and in a direction to release the belt from tension.

When the partition of the intermediate pulley is to be axially shifted for a speed change with this arrangement, the tension pulley is moved in the direction to release at least one of the belts from tension. The partition is then smoothly movable axially of the intermediate pulley without necessitating a great force for the speed change. On completion of speed change, the tension pulley is moved in the direction to tension the belt.

As a third feature, the present invention provides a stepless speed change mechanism in a belt transmission device comprising a first belt passed through a groove in a drive pulley on a drive shaft and a first groove in an intermediate pulley on an intermediate shaft, and a second belt passed through a second groove in the intermediate pulley and a groove in a driven pulley on a driven shaft, each of the two grooves in the intermediate pulley having an axial width gradually decreasing radially inwardly of the pulley, the first and second grooves being defined by a partition provided therebetween and movable on the intermediate shaft axially thereof, the pitch diameter of each of the two grooves in the intermediate pulley being variable by the axial movement of the partition. The state of contact of the first belt with the first groove portion is made different from the state of contact of the second belt with the second groove portion so that when the partition on the intermediate shaft is moved axially thereof, the axial component of the pushing force exerted on the partition by one of the first and second belts differs in magnitude from the axial component of the reaction force exerted on the partition by the other belt, at least one of the first belt and the second belt being provided with a tension pulley movable in a direction to tension the belt and a direction to release the belt from the tension.

Thus, the mechanism has the advantages afforded by both the first and second features.

According to the invention, line segments interconnecting the centers of rotation of the respective drive pulley, driven pulley and intermediate pulley form a triangle. This arrangement assures effective use of space. Preferably, the tension pulley is disposed inside the triangle.

Preferably, the intermediate shaft is attached to an arm provided pivotally movably about an axis in parallel to the rotary shafts of the pulleys, whereby the intermediate pulley is made axially movable by moving the intermediate shaft.

When the mechanism of the invention is to be used for a mower, it is desirable to couple the driven pulley to a drive wheel of the mower and to form in the drive pulley a groove for passing a cutter blade drive belt therethrough. The present mechanism assures the mower of a smooth change in the speed of its travel and serves to simplify the drive means for the cutter blade.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a side elevation in section showing a stepless speed change mechanism embodying the present invention;

FIG. 2 is a plan view of the same;

FIG. 3 is a side elevation of a mower of the walk-behind type;

FIG. 4 is a plan view of the same;

FIG. 8 is a plan view of a belt transmission device for running and for driving cutting blades as another embodiment of the invention;

FIG. 9 is an overall side elevation of another mower of the walk-behind type;

FIG. 10 is an overall plan view of the mower;

FIG. 11 is a fragmentary rear view in section of FIG. 8;

FIG. 12 is a fragmentary side elevation in section of the same;

FIG. 13 is a rear view in section of a transmission case;

FIG. 14 is a side elevation in section of the same;

FIG. 15 is a view showing a back gear as installed in place;

FIG. 18 is a side elevation in section of a running control lever assembly;

FIG. 19 is a rear view in section of the same;

FIG. 20 is a plan view of the same;

FIG. 21 is a fragmentary plan view of a handle;

FIG. 22 is a fragmentary side elevation of the same;

FIG. 23 is a side elevation showing the steering belt transmission during forward rotation;

FIG. 24 is a side elevation showing the same during reverse rotation;

FIGS. 26 to 30 are side elevations showing different steering belt transmissions.

DESCRIPTION OF THE PREFERRED EMBODIMENTS

Figure 6:
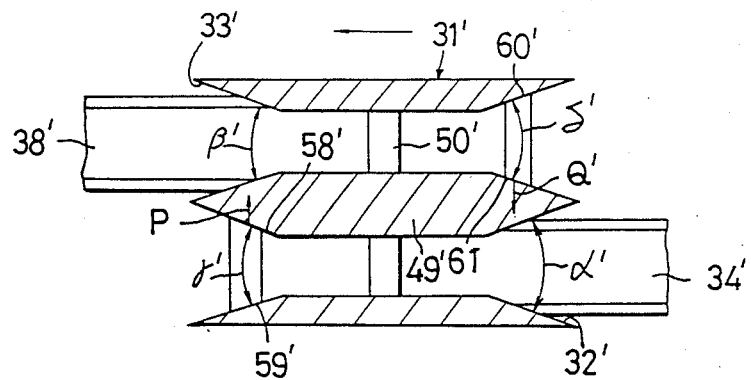
FIG. 6 is a diagram for illustrating a comparative example.

FIGS. 1 to 4 show a mower 1 of the walk-behind type embodying the present invention. With reference to FIGS. 3 and 4, the mower 1 comprises a mower body 2, machine frame 3, handle 4, front and rear wheels 5, 6, engine 7, rear wheel drive transmission case 8, fuel tank 9 and clipping container 10.

The mower body 2 has a deck 11, and a cutting blade 12 disposed under the deck 11 and drivingly rotatable about a vertical axis. The body 2 is suspended from the machine frame 3 by a link assembly 13 upwardly or downwardly movably and is connected to the clipping container 10 by a duct 14.

The machine frame 3 is rectangular when seen from above and has a frame member projecting outward from its front end laterally. The frame member carries the front wheels 5 each rotatable about a vertical shaft 15.

The handle 4 is U-shaped when seen from above, extends upward from the rear end of the frame 3 and is bent rearward. The rear ends of the handle 4 serve as grips 16.

The engine 7 is mounted on the machine frame 3 approximately at the longitudinal midportion thereof and has a drive shaft 17 projecting downward from its bottom. Power is transmitted from the drive shaft 17 to the cutting blade 12 and the rear wheels 6 via a belt transmission mechanism.

As seen in FIG. 1, a drive pulley 18 is mounted on the drive shaft 17 rotatably therewith and has in its outer periphery a pair of upper and lower grooves 19, 20.

A cutting blade drive belt 22 is passed through the upper groove 19 of the drive pulley 18 and around a pulley (not shown) mounted on a rotary shaft 21 for the blade 12 for receiving power to rotate the blade. The belt 22 is usually slack without transmitting power therethrough but is tensioned for power transmission when pressed on by a cutter tension roller 26. With reference to FIG. 2, the tension roller 26 is mounted on one end of a V-shaped bracket 28 supported by a pivot 27 on the frame 3 and is biased by an unillustrated spring in a direction away from the belt 22. Connected to the other end of the bracket 28 is one end of a push-pull wire 30 for pivotally moving the bracket 28 to press the tension roller 26 against the belt 22. The other end of the wire 30 is coupled to a control lever mounted on the handle 4, whereby power transmission to the blade 12 is effected or interrupted.

Next with reference to FIGS. 1 and 2, an intermediate pulley 31 rotatable about an intermediate shaft 50 is mounted on the frame 3. The pulley 31 has a first groove 32 and a second groove 33 positioned above the groove 32. A first belt 34 is passed through the lower groove 20 of the drive pulley 18 and the first groove 32 of the intermediate pulley 31.

A driven shaft 35 extends downward from the bottom of the transmission case 8. A second belt 38 is passed through a groove 37 in a driven pulley 36 on the driven shaft 35 and through the second groove 33 in the intermediate pulley 31.

Line segments interconnecting the centers of rotation of the respective drive pulley 18, driven pulley 36 and intermediate pulley 31 form a triangle.

A tension pulley 39 for tensioning the first belt 34 is mounted on an arm 40 which is supported by a pivot 41 on the frame 3. The pulley 39 is biased by a spring 42 toward a direction to tension the belt 34.

Power is transmitted to transmission shafts 43 projecting from opposite sides of the case 8 from the driven shaft 35 via a train of speed change gears inside the transmission case 8. A belt 47 is reeved around a pulley 46 on each rear wheel axle 45 and a pulley 44 mounted on each transmission shaft 43, whereby the power of the engine 7 is transmitted to the opposed rear wheels 6 to propel the mower.

By changing the meshing engagement between gears in the transmission case 8, the direction of rotation of the transmission shafts 43 is changeable to permit the mower 1 to travel forward or rearward. Each of the belts 47 coupling the shafts 43 to the respective rear wheel axles 45 is tensioned by a tension pulley 48 which is shiftable to release the belt 47 from the tension. Thus, the power transmission from the transmission shafts 43 to the rear wheel axles 45 can be effected or interrupted to stop or steer the mower 1.

To change the speed of travel of the mower 1, the two grooves 32, 33 of the intermediate pulley 31 have an axial width gradually decreasing radially inwardly of the pulley 31 as seen in FIGS. 1 and 2. A partition 49 provided between and defining the two grooves 32, 33 is fitted around the intermediate shaft 50 and movable axially thereof. The intermediate shaft 50 is mounted on the forward end of an arm 52 supported on a vertical pivot 51 on the machine frame 3 and is thereby made movable radially thereof so that when moving away from one of the drive shaft 17 and the driven shaft 35, the intermediate shaft 50 approaches the other shaft.

By virtue of the above arrangement, the partition 49 is at a lower level when the shaft 50 is in a position (position A in FIG. 2) close to the drive shaft 17 than when the shaft 50 is in a position (position B in FIG. 2) close to the driven shaft 35, giving a large pitch diameter to the first groove 32 and a small pitch diameter to the second groove 33. Consequently, as the intermediate shaft 50 is shifted from position A toward position B, the partition 49 axially moves upward to steplessly increase the speed of the driven shaft 35. When the partition moves in a direction Opposite to the above, the speed is steplessly decreased.

With the above stepless speed change mechanism, the intermediate shaft 50 is shifted radially thereof by an assembly comprising a connecting rod 53 pivoted to the arm 52, an L-shaped lever 55 supported by a horizontal pivot 54 on the frame 3 and pivoted to the rod 53, and a control lever 57 disposed in the vicinity of the handle 54 and coupled to the L-shaped arm 55 by a push-pull wire 56. Thus, the intermediate shaft 50 is shiftable by pivotally moving the arm 52 about the pivot 51 with the control lever 57.

When the intermediate shaft 50 at rest is moved radially thereof, one of the first and second belts 34, 38 exerts a pushing force on the partition so as to move the partition axially, and at the same time, the other belt exerts a reaction force on the partition 49, because the first and second belts 34, 38 are tensioned. The state of contact of the first belt 34 with the first groove portion 32 is adjusted to be different from the state of contact of the second belt 38 with the second groove portion 33 in order to make the axial component of the pushing force different in magnitude from the axial component of the reaction force.

More specifically stated with reference to FIG. 1, the groove angle $\alpha$ of the first groove 32 and the groove angle $\beta$ of the second groove 33 are both 20 degrees. The relative inclination angle $\gamma$ between the two faces 58, 59 of the first belt 34 which are in contact with the first groove portion 32 is 26 degrees, whereas the relative inclination angle $\delta$ between the two faces 60, 61 of the second belt 38 which are in contact with the second groove portion 33 is 22 degrees.

Owing to the difference between the relative inclination angles, the axial component of the pushing force exerted by the second belt 38 on the partition 49 is greater than the axial component of the reaction force of the first belt 34 acting on the partition 49, rendering the partition 49 easy to move toward a direction to decrease the pitch diameter of the second groove 33. Once the partition 49 starts to move in one axial direction, the tension balance between the belts 34, 38 while the partition 49 is at rest is upset during the movement, and the tension on one of the belts decreases or the coefficient of friction between that belt and the groove portion concerned diminishes. This permits speed change control with ease. Further when the partition 49 is to be moved in the other direction to increase the pitch diameter of the second groove 37, the intermediate shaft is moved once slightly in a direction opposite to the desired direction to alter the tension balance between the belts, whereby the partition is readily movable in the desired direction before the initial balanced state is brought about.

The above operation will be understood more clearly with reference to the comparative example shown in FIG. 6. With this comparative example, the groove angle $\alpha'$ of a first groove 32' in an intermediate pulley 31' is equal to the groove angle $\beta'$ of a second groove 33' in the pulley 31'. The relative inclination angle $\gamma'$ between the two faces 58', 59' of a first belt 34' in contact with the first groove portion 32' is also equal to the relative inclination angle $\delta'$ between the two faces 60', 61' of a second belt 38' in contact with the second groove portion 33'.

When it is attempted to axially shift a partition 49' upward in the drawing to decrease the pitch diameter of the first groove 32', the first belt 34' exerts a pushing force on the partition 49', and at the same time, the second belt 38' exerts a reaction force on the partition 49'. When the partition 49' is to be moved axially in a direction opposite to the above, the same action occurs although the pushing force and the reaction force are in a reverse relation to the above description. Thus, state of contact of the first belt 34' with the first groove portion 32' is identical with the state of contact of the second belt 38' with the second groove portion 33', so that the axial components P', Q' of the pushing force and the reaction force are equal. Thus, even if it is attempted to axially move the partition 49' in either direction, the axial forces acting on the partition 49' in opposite directions to each other are equal, restraining the axial movement of the partition 49' to make the speed unchangeable.

In the comparative example, if it is possible to move the intermediate shaft 50' radially thereof once as by shaking the shaft 50' with a great force and thereby momentarily slackening one of the belts 34', 38', the shaft 50' is thereafter movable without necessitating a great force because the coefficient of dynamic friction between the belt and the groove portion is smaller than the coefficient of static friction therebetween and further because the tension balance between the belts 34', 38' while the shaft 50 is at rest is upset during the movement of the shaft 50', with diminished tension acting on one of the belts. However, it is inefficient to move the intermediate shaft 50' at rest, for example, by shaking the shaft 50' with a great force, while experiencing trouble, which may result in damage or breakage.

The present embodiment is free of such a problem encountered with the comparative example.

According to the foregoing embodiment, the lower groove 20 of the drive pulley 18 has a groove angle ε of 24 degrees and the driven pulley 36 a groove angle of 20 degrees. Thus, the difference between the groove angle and the relative inclination angle of the belt fitting in the groove concerned is 4 degrees only at the first groove 32 and 2 degrees at the other grooves. At the grooves, other than the groove 32, where the difference is 2 degrees, the belt under tension is in face-to-face contact with the groove portion, while only at the groove 32 where the difference is 4 degrees, the faces 58, 59 of the first belt 34 are nearly in line contact with the first groove portion 32.

The states of contact of the two belts with the respective groove portions may be otherwise made different. For example, the first and second belts may be made identical in relative inclination angle, and the first and second grooves made different in groove angle. Alternatively, one combination of relative inclination angle and groove angle may be made different from the other combination. Further alternatively, one of the first and second grooves may be defined by a flat surface, with the other groove by a curved surface.

Figure 5:
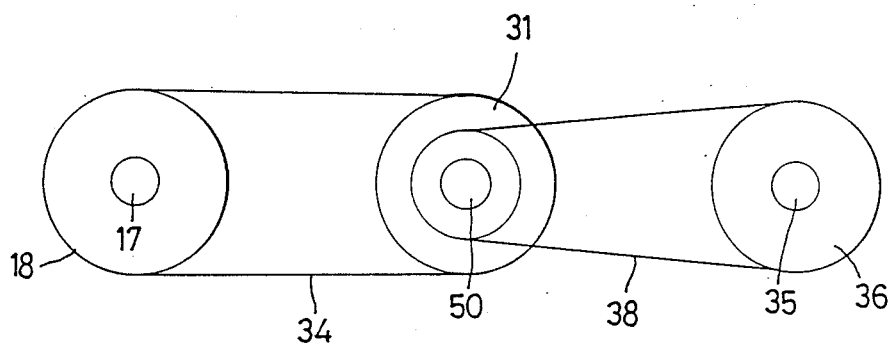
FIG. 5 is a diagram schematically showing a modification of stepless speed change mechanism.

Although the drive shaft 17, the intermediate shaft 50 and the driven shaft 35 are not arranged along a straight line according to the above embodiment, these shafts may alternatively be arranged along a straight line as seen in FIG. 5, with the intermediate shaft 50 made movable straight along the line. The arrangement may otherwise have the same construction as already stated.

Figure 7:
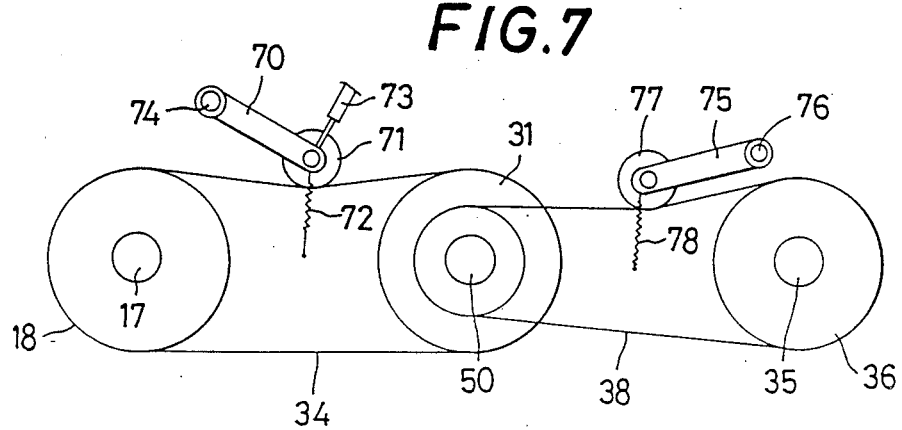
FIG. 7 is a diagram showing another modification of stepless speed change mechanism.

FIG. 7 shows an arrangement wherein the partition 49 is axially movable without shifting the intermediate shaft 50 radially thereof. The intermediate shaft 50 is fixed to the machine frame 3 and prevented from moving radially thereof. An arm 70 is supported by a vertical pivot 74 on the frame 3 and carries a tension pulley 71 in contact with the first belt 34. A spring 72 is attached to and extends between the arm 70 and the frame 3 for biasing the tension pulley 71 in a direction to tension the first belt 34. The arm 70 is connected to a push-pull wire 70 which is operated in the vicinity of the handle 54 to pivotally move the arm 70. An arm 75 is supported by a vertical pivot 76 on the frame 3 and carries a tension pulley 77 in contact with the second belt 38. A spring 78 is provided between the arm 75 and the frame 3 for biasing the tension pulley 77 in a direction to tension the second belt 38. With the exception of the above feature, the arrangement has the same construction as the foregoing embodiment.

With the arrangement of FIG. 7, when the arm 70 is pivotally moved to increase the tension on the first belt 34, the partition 49 is axially moved in such a direction as to decrease the pitch diameter of the first groove 32 and increase the pitch diameter of the second groove 33. The partition 49 axially moves in the reverse direction when the arm 70 is so moved as to diminish the tension on the first belt 34.

FIGS. 8 to 25 show a mower 101 of the walk-behind type different from the one shown in FIGS. 1 to 4 and embodying the present invention. With reference to FIGS. 9 and 10, the mower 101 comprises a mower body 102, machine frame 103, handle 104, front and rear wheels 105, 106, engine 107, rear wheel drive transmission case 108, fuel tank 109 and clipping container 110.

The mower body 102 has a deck 111, and three cutting blades 112 disposed under the deck 111 and each drivingly rotatable about a vertical axis. The body 102 is suspended from the machine frame 103 by a link assembly 113 upwardly or downwardly movably and has gauge wheels 114 in contact with the ground.

The machine frame 103 is rectangular when seen from above and has a frame member projecting outward from its front end laterally. The frame member carries the front wheels 105 each rotatable about a vertical shaft 115.

The handle 104 is U-shaped when seen from above, extends upward from the rear end of the frame 103 and is bent rearward. The rear end of the handle 104 serves as a grip 116.

The engine 107 is mounted on the machine frame 103 approximately at the longitudinal midportion thereof and has a drive shaft 117 projecting downward from its bottom. Power is transmitted from the drive shaft 117 to the cutting blades 112 and the rear wheels 106 via a belt transmission mechanism.

As seen in FIG. 12, a drive pulley 118 is mounted on the drive shaft 117 rotatably therewith and has in its outer periphery a pair of upper and lower grooves 119, 120.

A cutting blade drive belt 123 is passed through the upper groove 119 in the drive pulley 118 and around a power receiving pulley 122 on a rotary shaft 121 for the central cutting blade 112 included in the three blades. Power transmission pulleys 124 are mounted on the rotary shafts for the respective cutting blades 112, with a transmission belt 125 reeved around the pulleys 124.

Through the above arrangement, the cutting blades 112 are drivingly rotated by the engine 107.

The blade drive belt 123 is usually slack without transmitting power therethrough but is tensioned for power transmission when pressed on by a cutter tension roller 126. With reference to FIG. 8, the tension roller 126 is mounted on one end of a V-shaped bracket 128 supported by a pivot 127 on the frame 103 and is biased by a spring 129 in a direction away from the belt 123. Connected to the other end of the bracket 128 is one end of a push-pull wire 130 for pivotally moving the bracket 128 to press the tension roller 126 against the belt 123. The other end of the wire 130 is coupled to a blade drive lever 131 shown in FIGS. 21 and 22. The lever 131 is U-shaped when seen from above and coextensive with the grip 116 and supported at each end by a lateral pivot 132 on the handle 104. The lever end projects upward from the pivoted portion and has attached thereto the other end of the wire 130. When the lever 131 is pivotally moved down, the tension roller 126 is pressed against the belt 123 to drive the cutting blades 112.

The rear wheel drive transmission case 108 is disposed behind the engine 107 and mounted on the machine frame 103. As seen in FIG. 13, a driven shaft 133 extends downward from the bottom of the case and carries a driven pulley 134 rotatably with the shaft 133.

A projecting arm 135 is attached to the bottom of the case 108. As seen in FIGS. 8 and 11, a pivotal arm 136 is supported by a vertical pivot 137 on the outer end of the projecting arm 135. The pivotal arm 136 comprises two members 136a and 136b which are connected together by means of a slot 138 and a bolt 139, whereby the arm 136 is made adjustable in length. A downwardly projecting intermediate shaft 140 is attached to the forward end of the arm 136.

When the intermediate shaft 140 is moved away from one of the drive shaft 117 and the driven shaft 133 by the pivotal movement of the pivotal arm 136, the shaft 140 approaches the other shaft. An intermediate pulley 141 is mounted on the intermediate shaft 140.

The intermediate pulley 141 is made free to rotate relative to the shaft 140 by a sleeve 142 and has a first groove 143 and a second groove 144 above the first groove 143. Each of the two grooves 143, 144 has an axial width gradually decreasing radially inwardly of the pulley 141. A partition 145 provided between and defining the two grooves 143, 144 is movable axially of the shaft 140. A first belt 146 is passed through the lower groove 120 in the drive pulley 118 and the first groove 143. A second belt 148 is passed through a groove 147 in the driven pulley 134 and the second groove 144. Thus, the rotation of the drive shaft 117 is transmitted to the driven shaft 133.

A control bracket 149 extends from the upper end of the intermediate shaft 140. A tension spring 150 connected between the forward end of the bracket 149 and the frame 103 biases the pivotal arm 136 in a direction to bring the shaft 140 closer to the driver shaft 117. Connected to the forward end of the control bracket 149 is one end of a push-pull wire 151 for pivotally moving the arm 136 so as to move the intermediate shaft 140 away from the drive shaft 117. The other end of the wire 151 is connected to a running control lever 152 shown in FIGS. 18 to 20.

The running control lever 152 comprises divided first, second and third members 153, 154 and 155. The first member 153 is supported by a pivot 156 projecting forward from the grip 116 of the handle 104 and is movable sidewise in opposite directions. The second member 154 is supported by a lateral pivot 157 on the first member 153 and is movable forward and rearward. The third member 155 is fitted in the second member 154 upwardly and downwardly movably and has a grip at its upper end. The control lever 152 is surrounded by a guide cover 158, with the third member 155 extending outward through a guide groove 159 in the cover 158. The guide groove 159 comprises a first guide groove 159a for guiding the forward or rearward movement of the lever 152, and a second guide groove 159a extending from the front end of the groove 159a for guiding the sidewise movement of the lever 152. Each of the grooves 159a, 159b has a plurality of enlarged portions 160. The enlarged portions 160 have such a diameter that a positioning tube 161 fixedly fitted around the third member 155 of the control lever 155 is movable through the portion 160. The tube 161 has such an outside diameter that it is not movable through the guide groove 159 except the enlarged portions 160. The third member 155 can be resiliently depressed by virtue of a compression spring 162 provided between the tube 161 and the second member 154. When the third member 155 is depressed, the tube 161 is positioned under the enlarged portion 160, permitting the control lever 152 to move along the guide groove 159.

The other end of the push-pull wire 151 is attached to the second member 154 of the control lever 152. Consequently, the control lever 152, when shifted rearward, moves the intermediate shaft 140 away from the drive shaft 117. The forward shift of the lever 152 moves the shaft 140 toward the drive shaft 117.

Now, the control lever 152 is shifted rearward to move the intermediate shaft 140 from position A in FIG. 1 to position B away from the drive shaft 117 but toward the driven shaft 133. The tension on the first belt 146 reeved around the drive pulley 118 and the intermediate pulley 141 then tends to increase, and the tension on the second belt 148 reeved around the pulley 141 and the driven pulley 146 tends to decrease.

Consequently, a component of force occurs which acts to axially move the partition 145 toward the second groove 144 since the axial width of each of the grooves 143, 144 of the intermediate pulley 141 gradually deceases radiallY inwardly of the pulley. This axially moves the partition 145 toward the second groove 144, whereby the first and second belts 146, 148 as reeved around the pulley 141 are moved from the solid-line position to the phantom-line position shown in FIG. 11. This movement decreases the pitch diameter of the first groove 143 and increases the pitch diameter of the second groove 144, consequently giving an increased speed to the driven shaft 133.

Conversely, if the control lever 152 is shifted forward, bringing the intermediate shaft 140 closer to the drive shaft 117, the speed of the driven shaft 133 is decreased.

A tension pulley 207 is in contact with the first belt 146 on the slack side thereof and is mounted on one end of a support arm 210 rotatably about a vertical axis. The support arm 210 is supported at an intermediate portion thereof by a vertical pivot 211 secured to the frame 103. A tension spring 212 has one end attached to the other end of the support arm 210 and the other end attached to the frame 103, whereby the support arm 210 is so biased in a direction as to cause the tension pulley 207 to tension the first belt 146.

A control wire 213 is attached at its one end to the above-mentioned one end of the support arm 210 and has the other end connected to an unillustrated control lever. The control lever, when manipulated, pivotally moves the support arm 210 in a direction to cause the tension pulley 207 to relieve the first belt 146 of the tension. Thus, the first belt 146 can be freed from the tension to be imparted by the tension pulley 207 before the pivotal arm 136 is moved for a speed change. This diminishes the force needed to shift the lever 152 for the movement of the pivotal arm 136, assures smooth speed change control and serves to preclude a break of the wire or like trouble.

The centers of the respective drive pulley 118, intermediate pulley 141 and driven shaft 133 are arranged not on a straight line but at the vertexes of a triangle, with the intermediate pulley 141 made pivotally movable instead of a linear motion, whereby the shift of the slack side of the first belt 146 for the speed change can be minimized. Consequently, the shift of the tension pulley 207 bearing on the slack side of the first belt 146 to be involved in a maximum speed change can be very small as represented by the positions A and B in FIG. 8. As a result, the lever can be manipulated for any speed change with a constant feel in pivotally moving the tension pulley 207 biased by the spring 212.

The rotation of the driven shaft 133 thus subjected to a speed change is transmitted to the rear wheels 106 via a gear transmission 163 and a pair of steering belt transmissions 164 within the transmission case 108, whereby the speed of travel of the mower is changed.

FIGS. 13 to 15 show the gear transmission 163. The driven shaft 133 is supported by bearings 165 on the transmission case 108 and carries at its inner end a first bevel gear 166 meshing with a second bevel gear 167. The gear 167 is mounted on a support shaft 168 which is supported at its opposite ends by the case 108 The shaft 168 carries a shift gear 169 which is movable axially thereof. A shift fork 170 is engaged in a peripheral groove in the shift gear 169 and attached to a shift shaft 171, which is supported by bearings 172, 173 on the case 108, axially movable and biased by a spring 174 rightward in FIG. 13.

The right end, shown in FIG. 13, of the shift shaft 171 is formed in its outer periphery with three circumferential grooves 175 arranged side by side axially of the shaft. The bearing 173 has incorporated therein a ball 176 fittable in the grooves 175 and biased in a direction to fit into the groove 175, whereby the shift shaft 171 is settable in one of the three positions along the axis of the shaft. These three positions are forward, neutral and reverse positions.

A shift lever 178 attached to the left end of the shift shaft 171 has an upper end supported by a pivot 179 on the transmission case 108 and a lower end connected to one end of a shift control wire 180. The other end of the wire 180 is connected to the lower end of the control lever 152, which when shifted sidewise in either direction, axially moves the shift shaft 171, causing the shift fork 170 to bring the shift gear 169 to the forward, neutral or reverse position.

The shift gear 169, when in the forward position, is in mesh with a transmission gear 181. When in the reverse position, the gear 169 is in mesh with a back gear 182. The back gear 182 is always in mesh with the transmission gear 181, which is mounted on a transmission shaft 183. The transmission shaft 183 extends outward from opposite sides of the transmission case 108 and has each end thereof positioned between the outer side of the machine frame 103 and the inner side of the rear wheel 106. A drive pully 184 of the transmission 164 is mounted on the shaft end.

Figure 17:
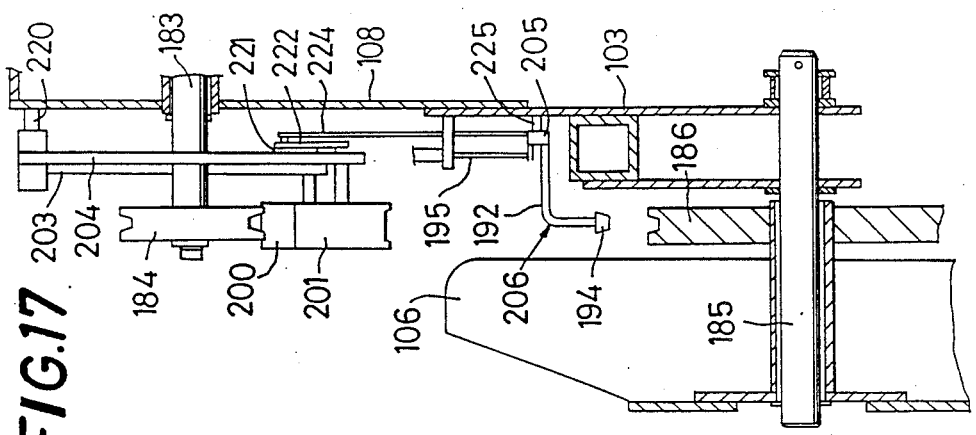
FIG. 17 is a rear view in section of the same.
Figure 16:
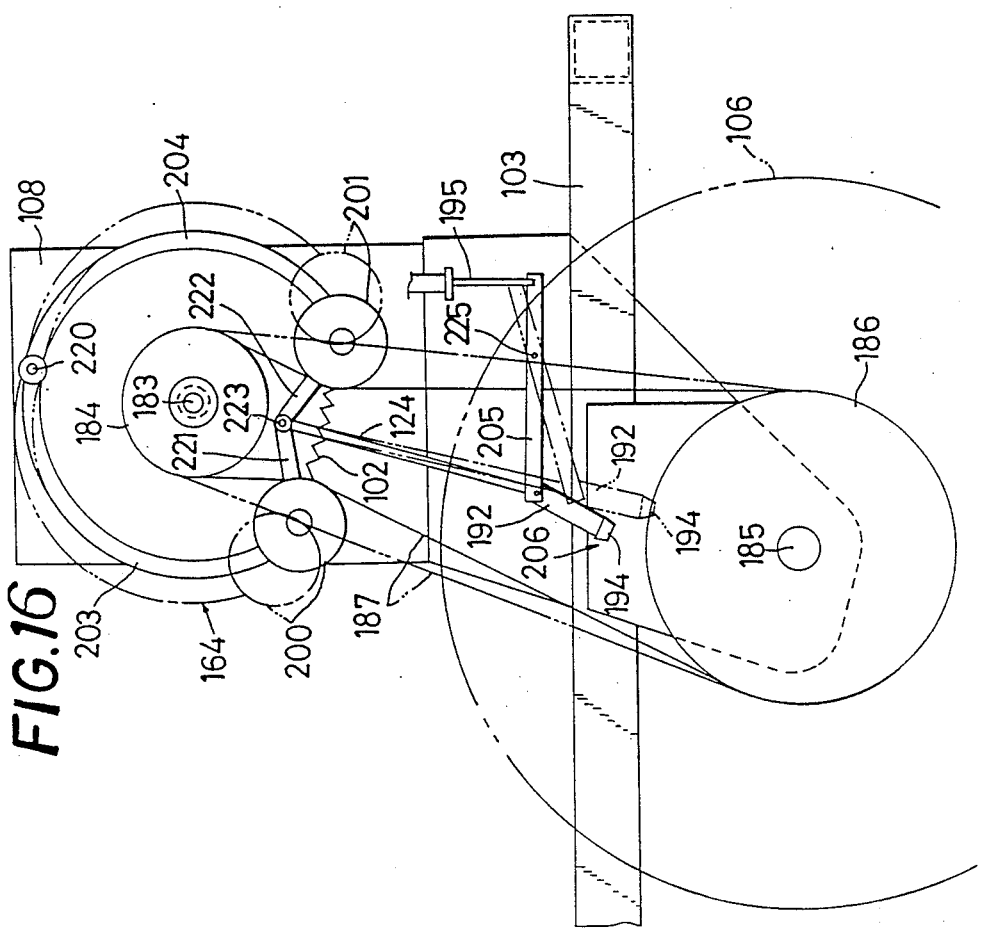
FIG. 16 is a side elevation of a belt transmission for steering.

The pair of steering belt transmissions 164 are provided for the respective rear wheels 106. With reference to FIGS. 16 and 17, the transmission 164 comprises the drive pulley 184, a driven pulley 186 on a rear axle 185 and a transmission belt 187 reeved around the two pulleys 184, 186.

Tension pulleys 200, 201 are in contact with the tensioned side and the slack side, respectively, of the transmission belt 187. The tension pulley 200 is rotatably mounted on one end of a first link 203. The other tension pulley 201 is rotatably mounted on one end of a second link 204. The links 203, 204 are each in the form of a circular arc and arranged to surround the drive pulley 184. The other ends of these links are supported by a lateral pivot 220 on the side wall of the transmission case 108.

The two links 203, 204 are interconnected by a tension spring 202 at the first-mentioned ends, whereby the two tension pulleys 200, 201 are so biased as to tension the transmission belt 187.

One end of a third link 221 is pivoted to the above-mentioned one end of the first link 203 movably about a lateral axis. One end of a fourth link 222 is similarly pivoted to the above-mentioned one end of the second link 204. The other ends of the third and fourth links 221, 222 are interconnected by a lateral pivot 223. A wire 224 has one end movably connected to the lateral pivot 223 and the other end having connected thereto one end of a coupling lever (member) 205. The coupling lever 205 is supported at an intermediate portion thereof by a lateral pivot 225 on the transmission case 108. A brake bracket 192 extends from the end of the coupling lever 205 integrally therewith and is provided at its forward end with a brake shoe 194. A brake push-pull wire 195 connected at its one end to the other end of the coupling lever 205 has the other end connected to a brake lever 196 which is pivoted to the handle 104 as seen in FIG. 22.

When the brake lever 196 is gripped and thereby pivotally moved, the coupling lever 205 moves to the phantom-line position shown in FIG. 16. Through the wire 224 and the links 221, 222, 203, 204, this movement is transmitted to the tension pulleys 200, 201, which are in turn moved away from each other against the force of the spring 202 as indicated in phantom line in FIG. 16. This frees the transmission belt 187 from the tension, interrupting power transmission from the drive pulley 184 to the driven pulley 186. At the same time, the brake shoe 194 is brought into pressing contact with the driven pulley 186 as indicated in phantom line in FIG. 16, braking the driven pulley 186 in rotation and braking the rear wheel.

When the brake lever 196 is released from an individual's hand, the brake shoe 194 is released from the pulley 186, and the transmission belt 187 is tensioned by the pulleys 200, 201. When the drive pulley 184 is forwardly rotated in the direction of arrow X as seen in FIG. 23 to advance the mower 101 forward, the right side shown of the belt 187 is tensioned with the left side thereof slackened, so that the belt 187 is bent by the tension pulleys 200, 201 by a greater amount on the left slack side. On the other hand, when the drive pulley 184 is reversely rotated in the direction of arrow Y as shown in FIG. 24 to retract the mower 101 rearward, the right side shown of the belt 187 is slackened with the left side thereof tensioned, with the result that the belt is bent by the tension pulleys 200, 201 by a greater amount on the right slack side. However, regardless of the direction of rotation of the drive pulley 184, the tension imparted to the transmission belt 187 by the tension pulleys 200, 201 biased by the force of the spring 202 is maintained at a constant value, assuring smooth transmission of torque.

With the mower 101, the control lever 152, when shifted forward or rearward, changes the speed of travel of the mower steplessly, and the lever is shiftable for the speed change without necessitating any great force. The control lever 152, when shifted sidewise, effects a change to the forward, reverse or neutral position, while change-over between forward and reverse causes no trouble to the transmission of torque.

Further when the opposite brake levers 196 are pivotally moved at the same time, the mower 101 can be braked to a stop. When one of these levers is manipulated, the mower can be steered sidewise.

When the cutter drive lever 131 is pivotally pushed down, the cutting blades 112 are driven for a mowing opeartion. The blades 112 stop when the lever is released from the depressed position.

Figure 25:
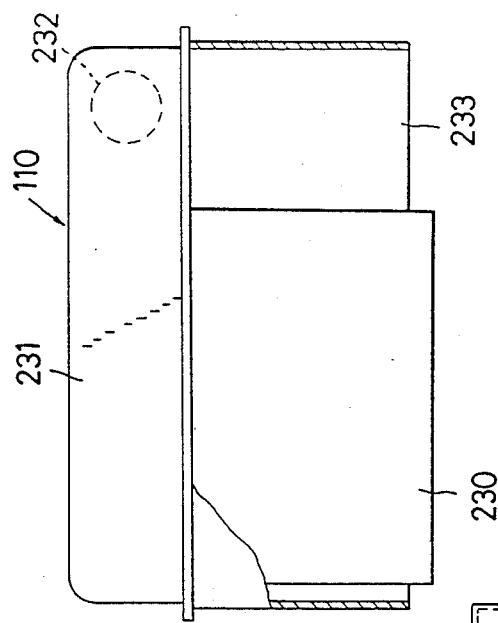
FIG. 25 is a rear view partly broken away and showing a clipping container of the mower.

With reference to FIG. 9 and FIG. 25, the clipping container 110 comprises a bag 230 and a rigid cover 231 covering an upper opening of the bag. A clipping duct 232 for transporting the clippings cut off by the mower body 102 is connected to the rigid cover 231. The clippings are transported from the mower body 102 to the container 110 using an air current produced by blower plates (not shown) on the cutting blades 112 and a blower (not shown) installed in an intermediate portion of the duct 232. In this case, the air flow likely escapes through the junction between the cover 231 and the bag 230 and flows toward the face of the operator. The air will then feel unsanitary and unpleasant. The cover 231 is therefore provided with a dustproof cover 233 extending downward from its outer periphery and covering the junction between the bag 230 and the cover 231 for deflecting the air flow toward the feet of the operator. The air and fragments of clippings flowing through the vents formed in the bag 230 will then be directed also toward the operator's feet.

FIGS. 26 to 30 show steering belt transmissions 164 which are different in construction from the one already described. Throughout the drawings concerned, like parts are designated by like reference numerals, and the different features only will be described below.

Figure 26:
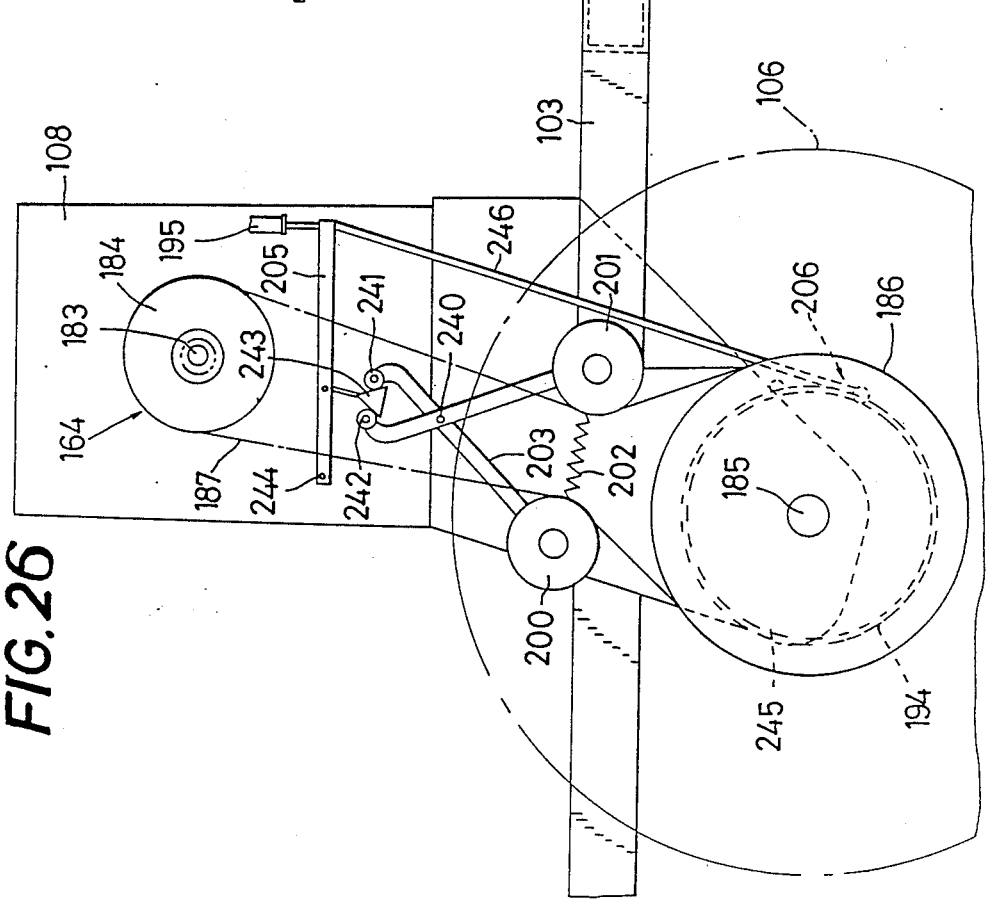

With the transmission shown in FIG. 26, a first link 203 and a second link 204 connected to tension pulleys 200, 201, respectively, intersect each other between the drive pulley 184 and the driven pulley 186 and are supported at the intersection by a lateral pivot 240 on the transmission case 108. Cam rollers 241, 242 are rotatably mounted on the upper ends of the first and second links 203, 204, respectively. A cam 243 which is generally triangular when seen from one side is positioned between and in contact with the two rollers 241, 242. The cam 243 is connected to an intermediate portion of a coupling lever 205, which is supported at its one end by a lateral pivot 244 on the transmission case 108. The brake push-pull wire 195 is connected to the other end of the lever 205.

The driven pulley 185 is provided with a brake device 206 comprising a brake drum 245 rotatable with the driven pulley 185, and a brake member 194 in the form of a band and reeved around the drum 245. The brake member 194 has one end attached to the drum side and the other end connected to one end of a brake wire 246. The other end of the brake wire 246 is connected to the other end of the coupling lever 205. The brake push-pull wire 195, when pulled, pivotally moves the coupling lever 205, thereby moving the cam 243 upward in the drawing and increasing the spacing between the two cam rollers 241, 242. The first and second links 203, 204 thereby pivotally moved relieve the transmission belt 187 of the tension imparted thereto by the tension pulleys 200, 201. At the same time, the bandlike brake member 194 is tightened up to brake the driven pulley 186.

The transmission shown in FIG. 27 comprises the arrangement of FIG. 26 including the tension pulleys 200, 201, cam 243, cam rollers 241, 242 and coupling lever 205, the arrangement being provided as turned upside down. The pivot 244 for supporting the coupling lever 205 is positioned between the cam connected portion and the wire connected portion of the lever 205. The transmission of FIG. 27 has the same construction as the one shown in FIG. 26 with the exception of these features.

In the transmission of FIG. 28, the first link 203 and the second link 204 intersect each other above the drive pulley 184. The cam 243, and cam rollers 241, 242 are provided as in the arrangement of FIG. 26. The coupling lever 205 has the pivoted portion 244 and the wire connected end which are arranged in a reverse relation to those of FIG. 26 with respect to lengthwise direction of the mower. The brake device 206, like the one shown in FIG. 26, comprises a bandlike brake member 194 and a brake drum 245. The brake member 194 is connected to the coupling lever 205 by a wire 246 and an L-shaped connecting rod 247. The transmission thus constructed operates in the same manner as the one shown in FIG. 26. The L-shaped connecting rod 247 is supported by a lateral pivot 248 on the frame 103.

Figure 29:
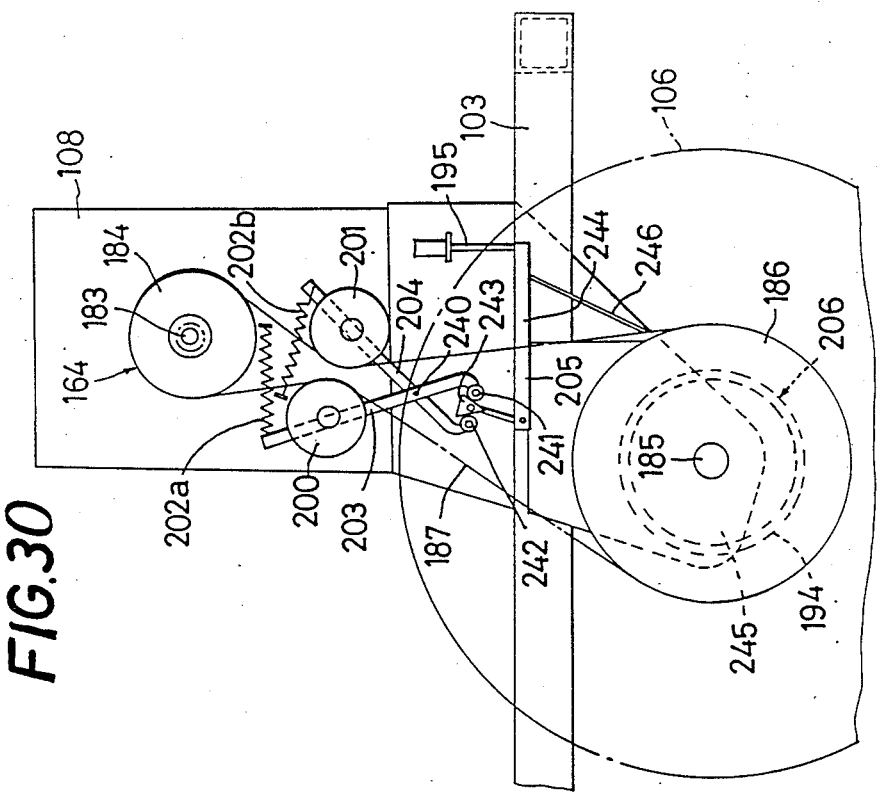

In the transmission shown in FIG. 29, the first link 203 and the second link 204 are supported, each at an intermediate portion thereof, by lateral pivots 249, 250 on the transmission case 108, respectively. The upper end of the first link 203 is connected to one end of an L-shaped fifth link 251, and the upper end of the second link 204 to one end of an L-shaped sixth link 252. The fifth and sixth links 251, 252 are respectively supported by lateral pivots 253, 254 on the case 108. The other ends of the fifth link 251 and the sixth link 252 are interconnected as supported by a lateral pivot 255 and are further connected to a coupling lever 205 by a seventh link 256. The coupling lever 205, like some of those already described, has one end pivoted to the transmission case 108, the other end connected to a brake push-pull wire 195, and an intermediate portion connected to a brake wire 246. The transmission has the same brake device 206 as shown in FIG. 26. With this transmission, the coupling lever 205, when pivotally moved by pulling the wire 195, moves the tension pulleys 200, 201 to relieve the belt 187 of the tension and brakes the driven pulley 186.

Figure 30:
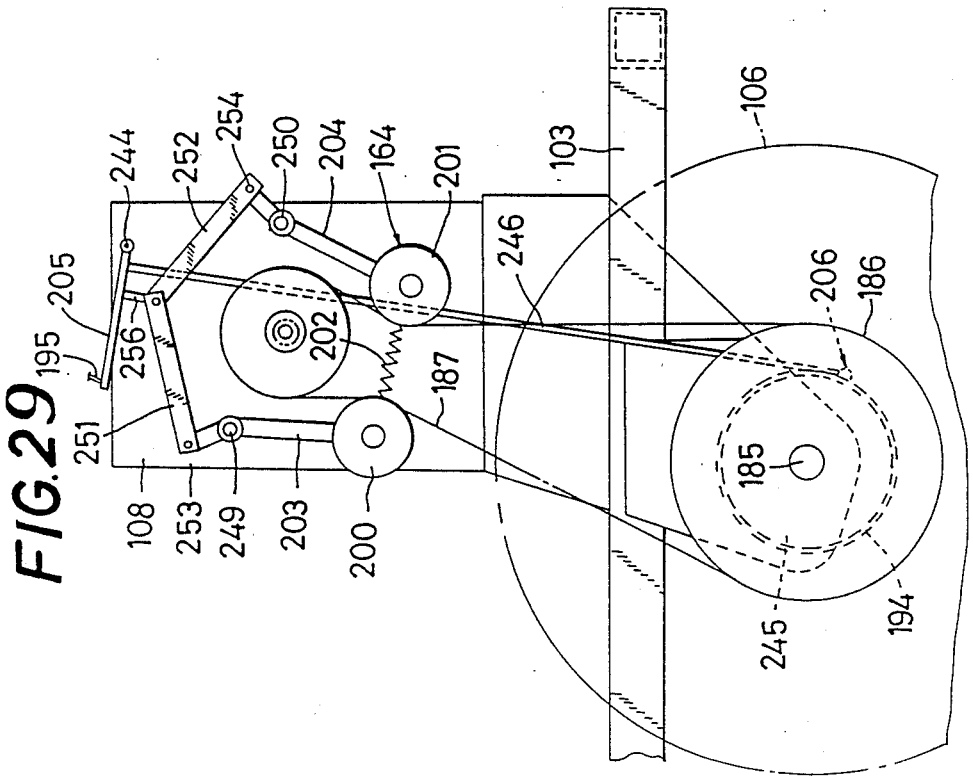

With the transmission shown in FIG. 30, the spring 202 for biasing the tension pulleys 200, 201 comprises two separate pulleys, and a spring 202a for one of the tension pulleys, and a spring 202b for the other tension pulley. More specifically, the spring 202a is connected between the first link 203 and the transmission case 108. The other spring 202b is connected between the second link 204 and the case 108. The transmission has the same construction as the one shown in FIG. 27 with the exception of the above feature and operates similarly.

Although the foregoing embodiments are belt transmission devices embodying the invention for use in mowers of the walk-behind type, the invention is of course not limited to such application. The tension pulley 207 provided in contact with the first belt 146 may alternatively bear on the second belt 148 or on both the belts 146, 148.

What is claimed is:

1. A stepless speed change mechanism in a belt transmission device comprising a first belt passed through a groove in a drive pulley on a drive shaft and a first groove in an intermediate pulley on an intermediate shaft, and a second belt passed through a second groove in the intermediate pulley and a groove in a driven pulley on a driven shaft, each of the two grooves in the intermediate pulley having an axial width gradually decreasing radially inwardly of the pulley, the first and second grooves being defined by a partition provided therebetween and movable on the intermediate shaft axially thereof, the pitch diameter of each of the two grooves in the intermediate pulley being variable by the axial movement of the partition, the stepless speed change mechanism being characterized in that the state of contact of the first belt with the first groove portion is varied relative to the state of contact of the second belt with the second groove portion so that when the partition on the intermediate shaft is moved axially thereof, the axial component of the pushing force exerted on the partition by one of the first and second belts differs in magnitude from the axial component of the reaction force exerted on the partition by the other belt.

2. A stepless speed change mechanism as defined in claim 1 wherein the combination of the groove angle of the first groove and the relative inclination angle between the two faces of the first belt in contact with the first groove portion is different from the combination of the groove angle of the second groove and the relative inclination angle between the two faces of the second belt in contact with the second groove portion, whereby the state of contact of the first belt with the first groove portion is varied relative to the state of contact of the second belt with the second groove portion.

3. A stepless speed change mechanism as defined in claim 1 wherein the surface defining the first groove and in contact with the first belt includes a distinct curvature relative to the surface defining the second groove and in contact with the second belt, whereby the state of contact of the first belt with the first groove portion is varied relative to the state of contact of the second belt with the second groove portion.

4. A stepless speed change mechanism as defined in any one of claims 1 to 3 wherein line segments interconnecting the centers of rotation of the respective drive pulley, driven pulley and intermediate pulley form a triangle.

5. A stepless speed change mechanism as defined in claim 4 wherein an arm is provided pivotally movably about an axis in parallel to the rotary shafts of the pulleys, and the intermediate shaft is attached to the arm.

6. A stepless speed change mechanism as defined in claim 5 wherein the driven pulley is coupled to a drive wheel of a mower, and the drive pulley is formed with a groove for a cutting blade drive belt to be passed therethrough.

7. A stepless speed change mechanism as defined in claim 4 wherein the driven pulley is coupled to a drive wheel of a mower, and the drive pulley is formed with a groove for a cutting blade drive belt to be passed therethrough.

8. A stepless speed change mechanism as defined in any one of claims 1 to 3 wherein the driven pulley is coupled to a drive wheel of a mower, and the drive pulley is formed with a groove for a cutting blade drive belt to be passed therethrough.

9. A stepless speed change mechanism as defined in claim 8, wherein the mower is mounted with a steering belt transmission mechanism.

10. A stepless speed change mechanism as defined in claim 1, wherein the tension pulley is movably mounted and displaceable toward a position applying increased tension and also toward a position applying decreased tension relative to at least one of said first and second belts.

11. A stepless speed change mechanism as defined in claim 10, wherein the combination of the groove angle of the first groove and the relative inclination angle between the two faces of the first belt in contact with the first groove portion is varied relative to the combination of the groove angle of the second groove and the relative inclination angle between the two faces of the second belt in contact with the second groove portion, whereby the state of contact of the first belt with the first groove portion is varied relative to the state of contact of the second belt with the second groove portion.

12. A stepless speed change mechanism as defined in claim 10, wherein the surface defining the first groove and in contact with the first belt includes a distinct curvature relative to the surface defining the second groove and in contact with the second belt, whereby the state of contact of the first belt with the first groove portion is varied relative to the state of contact of the second belt with the second groove portion.

13. A stepless speed change mechanism as defined in any one of claims 10 or 12 wherein the driven pulley is coupled to a drive wheel of a mower, and the drive pulley is formed with a groove for a cutting blade drive belt to be passed therethrough.

14. A stepless speed change mechanism as defined in any one of claims 10 or 12 wherein line segments interconnecting the centers of rotation of the respective drive pulley, driven pulley and intermediate pulley form a triangle.

15. A stepless speed change mechanism as defined in claim 14 wherein an arm is provided pivotally movably about an axis in parallel to the rotary shafts of the pulleys, and the intermediate shaft is attached to the arm.

16. A stepless speed change mechanism as defined in claim 15 wherein the driven pulley is coupled to a drive wheel of a mower, and the drive pulley is formed with a groove for a cutting blade drive belt to be passed therethrough.

17. A stepless speed change mechanism as defined in claim 15 wherein the tension pulley is disposed inside the triangle.

18. A stepless speed change mechanism as defined in claim 17 wherein the driven pulley is coupled to a drive wheel of a mower, and the drive pulley is formed with a groove for a cutting blade drive belt to be passed therethrough.

19. A stepless speed change mechanism as defined in claim 14 wherein the tension pulley is disposed inside the triangle.

20. A stepless speed change mechanism as defined in claim 19 wherein the driven pulley is coupled to a drive wheel of a mower, and the drive pulley is formed with a groove for a cutting blade drive belt to be passed therethrough.

21. A stepless speed change mechanism as defined in claim 14 wherein the pulley is coupled to a drive wheel of a mower, and the drive pulley is formed with a groove for a cutting blade drive belt to be passed therethrough.

22. A stepless speed change mechanism as defined in claim 10, wherein the intermediate shaft is fixed to the shafts for each of the pulleys.

* * * * *